United States Patent [19]

Teichmann et al.

[11] Patent Number: 5,180,199
[45] Date of Patent: Jan. 19, 1993

[54] APPARATUS FOR LOCKING AND UNLOCKING A FLAP DOOR, ESPECIALLY IN AN AIRCRAFT

[75] Inventors: Thorsten Teichmann; Volker Allerding, both of Bremen, Fed. Rep. of Germany

[73] Assignee: Deutsche Airbus GmbH, Hamburg, Fed. Rep. of Germany

[21] Appl. No.: 825,627

[22] Filed: Jan. 24, 1992

[30] Foreign Application Priority Data

Jan. 26, 1991 [DE] Fed. Rep. of Germany ....... 4102272

[51] Int. Cl.⁵ ............................................. E05C 17/12
[52] U.S. Cl. ............................ 292/259; 292/DIG. 71
[58] Field of Search ............... 292/259, 218, DIG. 71, 292/48, 53, 30, 241, 257

[56] References Cited

U.S. PATENT DOCUMENTS

| | | | |
|---|---|---|---|
| 1,489,981 | 4/1924 | Capeman | 292/239 |
| 1,820,238 | 8/1931 | Mears et al. | 292/48 X |
| 2,180,606 | 11/1939 | Oys et al. | 292/259 X |
| 3,761,135 | 9/1973 | Mundinger et al. | 292/259 X |

Primary Examiner—Richard E. Moore
Attorney, Agent, or Firm—W. G. Fasse

[57] ABSTRACT

A flap door for closing a hatch through a floor separating an upper and lower deck, e.g. in an aircraft, is equipped with a locking and unlocking mechanism in which a locking roller can be moved out of a locking position prior to any force applied to the door in an upward opening direction. For this purpose a bearing block is secured to the body of the flap door and a bell crank lever is journalled in the mounting block. One lever arm of the bell crank lever is constructed as a handle, while the other substantially shorter arm of the bell crank lever carries at its free end the locking roller. In its locking position the locking roller engages a spring biased locking claw. When the flap door is to be opened, the initial angular movement of the handle lever caused the roller to first disengage from the claw and then roll along a guide rail. When the unlocking is completed, the handle lever is in a substantially vertical position enabling the operator to apply an upwardly directed force to the flap door.

8 Claims, 3 Drawing Sheets

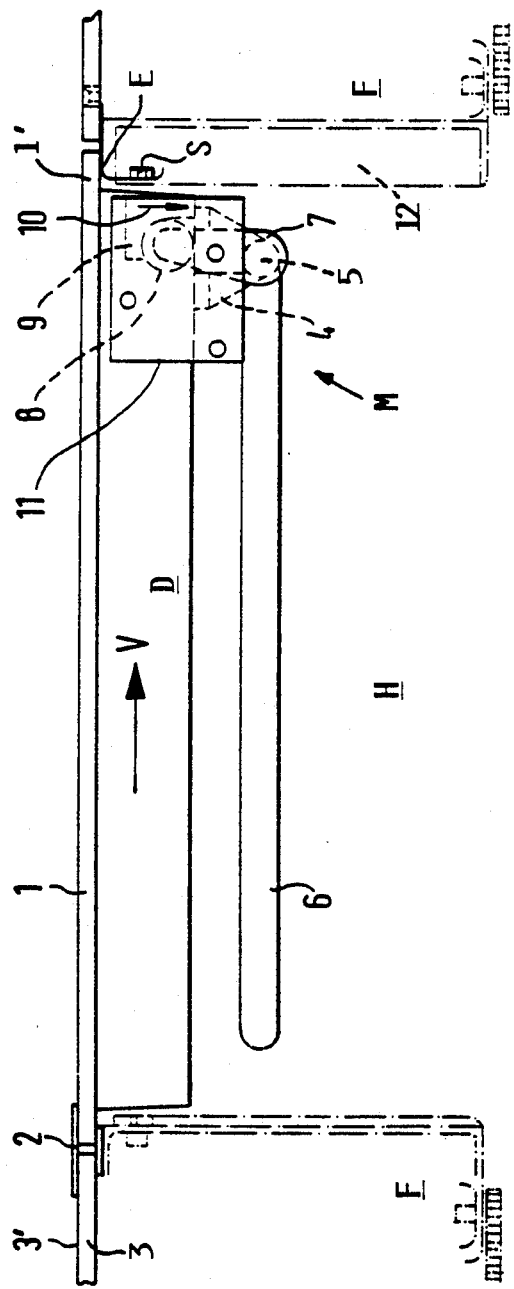
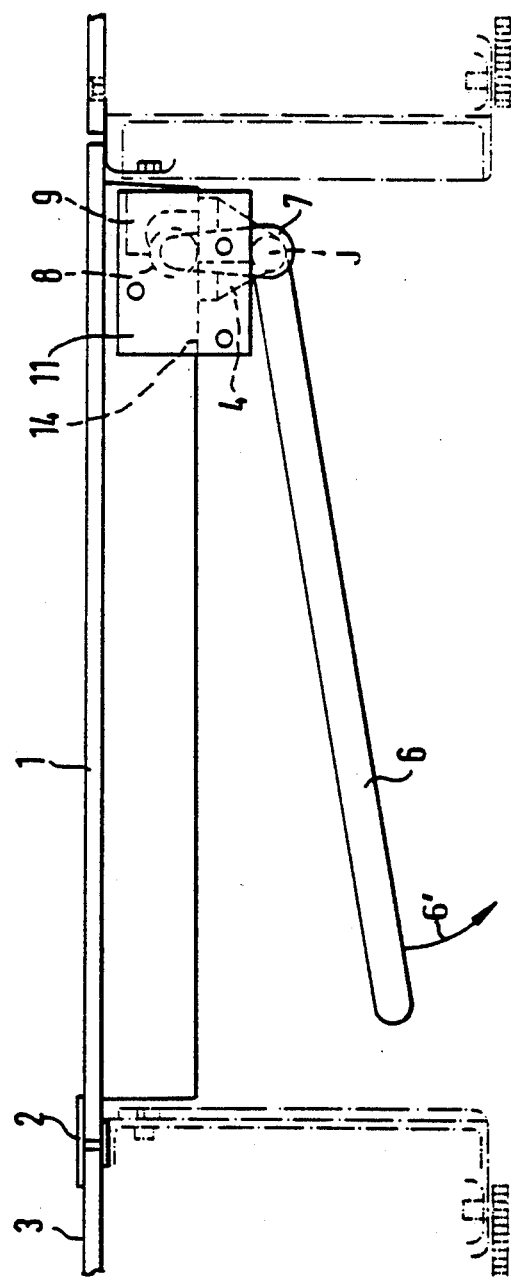

5,180,199

APPARATUS FOR LOCKING AND UNLOCKING A FLAP DOOR, ESPECIALLY IN AN AIRCRAFT

FIELD OF THE INVENTION

The invention relates to an apparatus for locking and unlocking a flap or gate, especially in a floor that separates an upper deck from a lower deck, for example, in an aircraft where a passenger space is separated by the floor from a freight space or from crew quarters.

BACKGROUND INFORMATION

Flap doors for the above purposes and devices for the locking and unlocking of such flap doors, are well known in the art in several variants. However, in connection with aircraft, especially commercial aircraft, such devices must meet regulations. Thus, the flap doors must, on the one hand, be capable of being safely locked, while on the other hand, it is necessary to be able to open such a flap door without problems even against an additional closing force exerted, for example, by a person standing on the flap door on the upper deck. Such requirements or regulations apply, for example, for long distance commercial aircrafts in which additional pilots and crew members travel in crew quarters below the passenger deck, whereby the crew quarters are accessible through these flap doors so that one shift of crew members can be exchanged against another shift of such crew members through this flap door. Opening of the flap door from below is possible only if there is no load on the flap door on the passenger cabin side. This is not always assured, since these flap doors are normally installed in the aisle. Thus, it is possible that a passenger or crew member is momentarily blocking the flap door by standing. There is no way of alerting the person of the intended opening.

OBJECTS OF THE INVENTION

In view of the foregoing it is the aim of the invention to achieve the following objects singly or in combination:

to construct the locking and unlocking device for a flap door of the type described above in such a manner that an opening is possible in the upward direction, even if an extra load should momentarily be applied to the flap from above;

to construct the locking and unlocking mechanism in such a way that it initially permits opening the flap door just a little, even if it is blocked, so as to alert a person standing on the flap door; and to construct the locking mechanism in such a way that it can be unlocked prior to opening and independently of a closing force effective on the flap door.

SUMMARY OF THE INVENTION

The above objects have been achieved according to the invention in a locking and unlocking mechanism for a flap door which is characterized in that a bearing block is secured to the flap door that is tiltable upwardly into a passenger cabin, wherein the bearing block supports a bell crank lever with two lever arms journalled to the bearing block, whereby one lever arm of the bell crank lever is constructed as a handle, while the other lever arm carries at its free end a roller that engages in the locked position into a locking claw or element when the locking mechanism is locked, whereby the roller can be caused to roll along a support member in response to an initial opening movement of the handle lever after overcoming a locking bias without yet opening the flap door.

This construction makes it possible to disengage the locking roller from the locking claw even if somebody should be standing on the flap. If then an opening push is applied through the handle lever to the flap door, a person standing on the flap door will be alerted. During the initial opening movement the roller merely needs to overcome the locking bias which is not difficult since the handle lever has a substantial advantage and the locking roller is thus easily removed from the locking claw. As long as the roller is rolling along its support member or rail, the flap door can be lifted at least a little to alert any person standing on the flap door that there is an intention to open the flap door by somebody on the lower deck. Once the alerted person steps off the flap door, it is easy to open.

BRIEF DESCRIPTION OF THE DRAWINGS

In order that the invention may be clearly understood, it will now be described, by way of example, with reference to the accompanying drawings, wherein:

FIG. 1 shows a side view of a door flap with its locking and unlocking mechanism according to the invention in its closed position;

FIG. 2 is a view similar to that of FIG. 1, however illustrating the beginning of the unlocking operation with the flap door still closed;

DETAILED DESCRIPTION OF A PREFERRED EXAMPLE EMBODIMENT AND OF THE BEST MODE OF THE INVENTION

Figure 5:
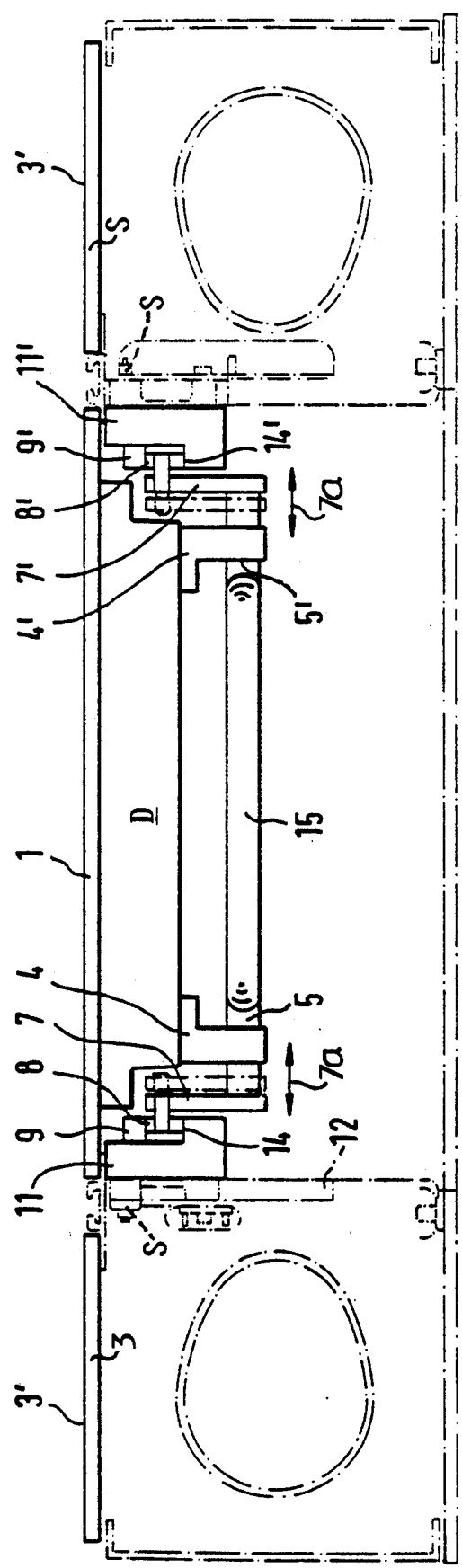
FIG. 5 illustrates a view in the direction of the arrow V in FIG. 1.

Referring to FIG. 1, the flap door 1 is shown in its closed condition, closing a hatch H in the floor structure F. The floor structure F includes a floor 3, the upwardly facing surface 3' of which is flush with the upwardly facing surface of the flap door 1, which is connected by hinge elements 2 to the floor 3. The free edge 1' of the flap door 1 rests in its closed condition on the upper edge E of a floor beam 12. A locking claw 9 is secured to the beam 12 by screw S. The components of the locking mechanism M that move with the flap door 1 are secured to a door body D, while a stationary guide rail 14 forming part of a guide structure 11, is secured to the floor beam 12 also by screws S. The movable portion of the locking mechanism M is mounted in a bearing block 4 which in turn is secured to the door body D as best seen in FIG. 5. A bell crank lever has a shaft 5 journalled in the bearing block 4. The bell crank lever has a long lever arm 6 constructed as a handle and a shorter lever arm 7 carrying at its free end a locking roller 8. When the flap door 1 is closed as shown in FIG. 1, the locking roller 8 engages the locking claw 9 which is positively biased into the locking position. Spring elements not shown in detail are indicated by an arrow 10 for this biasing purpose.

FIG. 2 shows the beginning of the unlocking operation. For this purpose the handle lever 6 is pulled downwardly in the direction of the arrow 6', whereby the locking roller 8 rolls out of the locking claw 9 against the force of the biasing spring 10.

Figure 3:
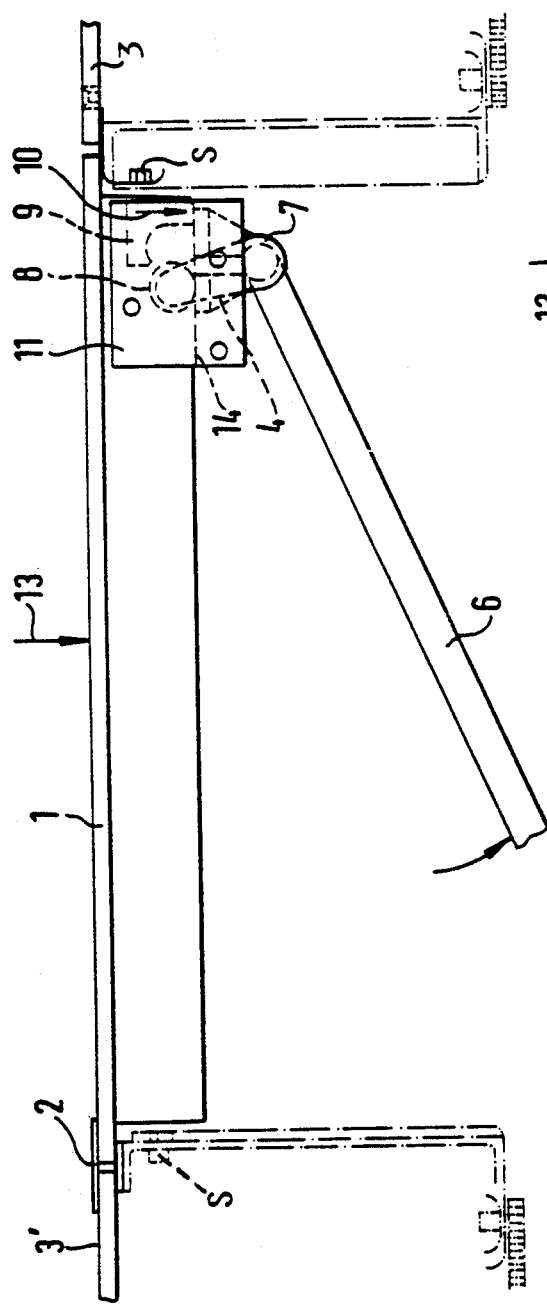
FIG. 3 shows a view similar to that of FIGS. 1 and 2 with the unlocking completed, but the flap door still closed.
Figure 4:
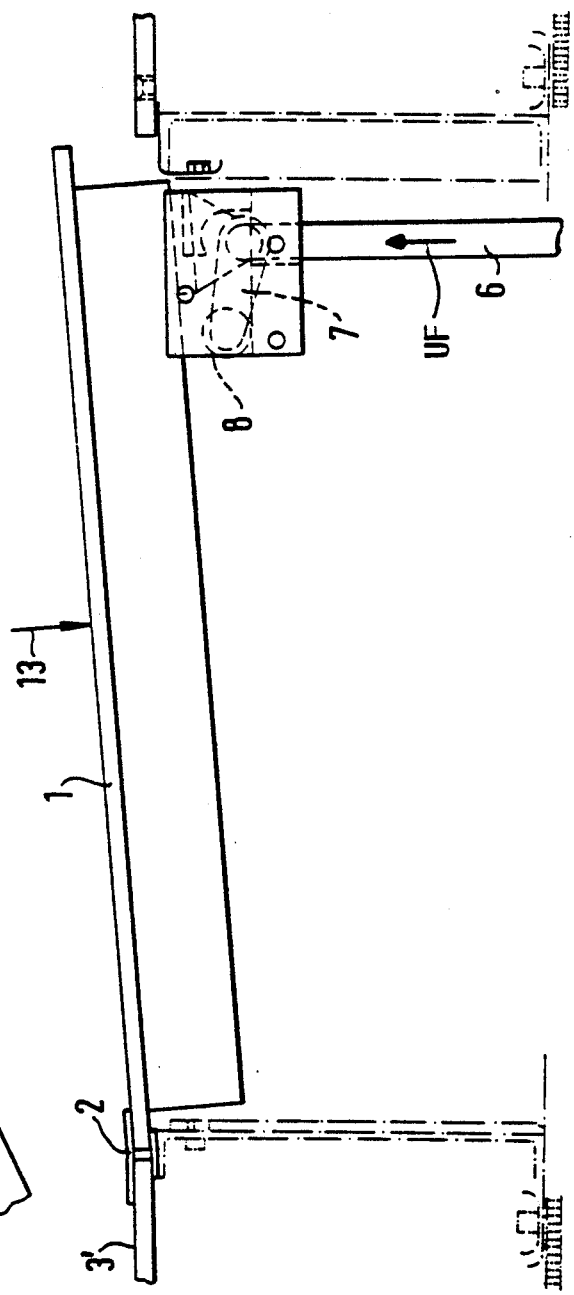
FIG. 4 shows the flap door in a slightly lifted position, thereby alerting any person on the flap door to step off it.

FIG. 3 shows the locking roller 8 already completely disengaged from the locking claw 9. However, the flap door 1 is still in its closed condition because a force 13 is effective on the flap door 1 in a direction tending to close the flap door. If the handle 6 is now tilted further toward a substantially vertical position, the handle 6 can be used for pushing the flap door 1 at least a little upwardly against the force 13 into a slightly opened condition as shown in FIG. 4, whereby the slanted condition of the flap door 1 caused by the upward force UF will alert a person exerting the force 13, of the fact that somebody wants to open the flap door. Once the force 13 is removed, the flap door can be easily opened.

As shown in FIG. 5, a left-hand locking mechanism has a mirror-symmetrical counterpart on the right-hand side of the flap door 1, whereby the reference numbers without prime are used for the left-hand locking mechanism, while the same reference numbers with a prime are used for designating the elements of the right-hand locking mechanism. Rather than providing each locking mechanism with its own long handle arm, the journal shafts 5, 5' may be interconencted by a bail 15 to form a through-going journal shaft that also forms a long handle arm for operating both locking mechanisms in unison.

FIG. 5 also shows in dash-dotted lines that the short lever arms 7, 7' may be shifted horizontally as indicated by the arrows 7a to disengage the locking rollers 8, 8' from the respective guide rail 14, 14'. For this purpose, the journals 5, 5' may have two tubular members carrying the levers 7, 7' at its ends, and whereby a spring in the telescoping members will cause the levers 7, 7' to normally assume the full line position shown in FIG. 5. This feature makes it possible to disengage the locking rollers 8, 8' from their guide rails when any pivoting around the journal shafts 5, 5' should be stuck.

Although the invention has been described with reference to specific example embodiments, it will be appreciated that it is intended to cover all modifications and equivalents within the scope of the appended claims.

What we claim is:

1. A locking mechanism for locking and unlocking a flap door, for example, in a floor separating two decks in a commercial aircraft, comprising a flap door tiltable into a passenger space, a bearing block secured to said flap door, comprising two sets of locking means arranged mirror-symmetrically relative to a central plane passing vertically through the flap door when the flap door is closed, said locking means being arranged near opposite edges of said flap door, said locking mechanism further comprising journal means for journalling said sets of locking means, each set of locking means comprising a bell crank lever journalled to said bearing block, said bell crank lever having a first means for operating said bell crank lever and a second means forming a lever arm for operating as a locking and unlocking element, a locking roller journalled to a free end of said lever arm, a locking claw secured to said floor for engagement with said locking roller, biasing means for biasing said locking claw into a locking position, and guide means for said locking roller arranged so that said locking roller can roll along said guide means after disengagement of the locking roller from the locking claw, whereby said mechanism can be unlocked before tilting said flap door.

2. The locking mechanism of claim 1, wherein said biasing means for said locking claw comprises spring means.

3. The locking mechanism of claim 1, wherein said guide means comprises a guide rail (14) secured to a frame in said floor surrounding said flap door.

4. The locking mechanism of claim 1, wherein said journal means comprise axially aligned journals for said bell crank levers, and wherein said first means for operating said bell crank lever comprises a bail (15) interconnecting said journals to form a through-going journal shaft for operating both sets of locking means in unison.

5. The locking mechanism of claim 4, wherein said common journal means comprise two journal shaft ends (5, 5') in axial alignment with each other, and a bail (15) interconnecting said two journal shaft ends for operating said locking mechanism and for opening said flap door.

6. The locking mechanism of claim 4, wherein said common journal means comprise means for mounting said short lever arm for a displacement in the direction of a longitudinal axis of said common journal means for an unlocking operation without using said long lever arm.

7. The locking mechanism of claim 6, wherein said means for mounting comprise two telescoping tubes, each carrying one of said short levers at its free end.

8. The locking mechanism of claim 1, wherein said first means comprise a long lever arm operating as a handle, and wherein said second means form a shorter lever arm than said long lever arm, whereby each of said two sets of locking means is individually operable.

* * * * *